(12) United States Patent
Takashima

(10) Patent No.: US 7,432,312 B2
(45) Date of Patent: *Oct. 7, 2008

(54) POLYURETHANE FOAM HAVING DEODORIZATION PROPERTY OR ANTIBACTERIAL EFFECT

(75) Inventor: Hisato Takashima, Takatsuki (JP)

(73) Assignee: Takashima Co., Ltd (Japan Corp), Takatsuki-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/835,342

(22) Filed: Apr. 28, 2004

(65) Prior Publication Data

US 2005/0245627 A1 Nov. 3, 2005

(51) Int. Cl.
*C08G 18/06* (2006.01)

(52) U.S. Cl. ............... 521/123; 521/99; 521/131; 521/170; 521/174

(58) Field of Classification Search ............ 521/99, 521/170, 174, 123, 131
See application file for complete search history.

(56) References Cited

U.S. PATENT DOCUMENTS

| | | | | |
|---|---|---|---|---|
| 4,839,397 A | * | 6/1989 | Lohmar et al. | 521/159 |
| 4,931,479 A | * | 6/1990 | Morgan | 521/76 |
| 5,418,311 A | * | 5/1995 | Schafer et al. | 528/60 |
| 6,204,300 B1 | * | 3/2001 | Kageoka et al. | 521/174 |
| 6,699,917 B2 | * | 3/2004 | Takashima | 521/174 |

OTHER PUBLICATIONS

Grant & Hackh's Chemical Dictionary, (1987), p. 126.*
1. China Patent Application entitled Method for Producing Shoe Material, Chinese Patent Application No. 200410031364. (CN1563158) The patent application appears to have been filed on (Mar. 16, 2004) and may have published much later. Japan Patent Abstract No. 2004-064005.
1. Japan Patent Reference JP 2001192307 of Jul. 17, 2001.
2. Japan Patent Reference JP 11286566 of Oct. 19, 1999.
3. Chinese Search Report from which 1&2 were reported.

* cited by examiner

*Primary Examiner*—John Cooney
(74) *Attorney, Agent, or Firm*—Curtis L. Harrington; Kathy E. Harrington; Harrington & Harrington

(57) ABSTRACT

The purpose of the present invention is to provide a polyurethane foam that is excellent in adsorption property of odor and humidity and antibacterial property.

Further, the purpose of the present invention is to provide the polyurethane foam that a user can recognize compounding of added agent such as deodorant and antibacterial agent in the polyurethane foam.

The polyurethane foam of the present invention has carbon powder and/or inorganic antibacterial agent in it. Low resilience polyurethane foam is suitable as the polyurethane foam.

6 Claims, 2 Drawing Sheets

POLYURETHANE FOAM HAVING DEODORIZATION PROPERTY OR ANTIBACTERIAL EFFECT

FIELD OF THE INVENTION

The present invention concerning a polyurethane foam having deodorization property or antibacterial effect. In detail, a purpose of the present invention is to provide the polyurethane foam that a user can visually understand compounding of additives such as deodorant and antibacterial agent in it.

The polyurethane foam is widely used as a shoe sole or inner sock, bedclothing such as a mattress or a pillow and cushioning material for a chair used in a home and a sheet used in a car.

When the polyurethane foam is used in above-mentioned products, mite is easy to infest and mold is easy to mould by sweat of a user or in high temperature and humidity circumstance in summer.

Since the user often directly touches the polyurethane foam, an infestation of the mite and moulding of the mould are not desirable in sanitarily. Sometime, the many infestation of the mite and much moulding of the mould lead to atopic dermatitis and allergic disease such as asthma.

Therefore, an addition of antibacterial agent for restraining of propagation of the mite and mould in the polyurethane foam has been attempted.

For example, in a reference 1, imidazole antifungal agent such as 2-methoxycarbonyl amino-benzimidazol or 2-methylcarbonyl amino-benzimidazole and carbamate antibacterial agent or phthalimide antibacterial agent are brought into solution with ethanol.

A producing method of a urethane foam having organic antibacterial and antifungal agent consists of drying and powdering said material is disclosed in a reference 1.

In a reference 2, the antibacterial polyurethane foam having N-(fluorodichloromethylthio)-phthalimide, 2-benzimidazole carbamic acid lower alkylester and/or 2-(4-thiazolyl)-benzimidazole is disclosed as antibacterial agent.

Reference 1 Japan Patent No. 3362140
Reference 2 Japan Patent No. 2672973

However, above-mentioned antibacterial polyurethane foam has following problem. Even if above-mentioned antibacterial agent is added in the polyurethane foam, when the antibacterial agent is used solely, antibacterial effect may be low. Especially, in summer with much moisture, suppression of the propagation of mould is difficult, and bad smell ocuurs.

Even if above-mentioned antibacterial agent is added in the polyurethane foam, it is difficult that a user recognizes existence of antibacterial agent in it, and the user cannot realize antibacterial agents, etc existing in the polyurethane foam.

Further, above-mentioned antibacterial agent of organic system is not always high safety to a human body and environment, sometimes, there is a case that the antibacterial agent causes an allergic disease.

SUMMARY OF THE INVENTION

The invention relates to a polyurethane foam including carbon powder and/or inorganic antibacterial agent.

The invention relates to the polyurethane foam, wherein said carbon powder is porous carbon powder and/or carbon black.

The invention relates to the polyurethane foam, wherein said inorganic antibacterial agent is held in the porous carbon powder.

The invention relates to the polyurethane foam, wherein said inorganic antibacterial agent is silver and/or titanium dioxide.

The invention relates to the polyurethane foam, wherein said inorganic antibacterial agent is silver and/or titanium dioxide.

The invention relates to the polyurethane foam, wherein said inorganic antibacterial agent is silver and/or titanium dioxide.

The invention relates to the polyurethane foam, wherein said polyurethane foam is a low impact resilience polyurethane foam.

The invention relates to the polyurethane foam, wherein said polyurethane foam is a low impact resilience polyurethane foam.

The invention relates to the polyurethane foam, wherein said polyurethane foam is a low impact resilience polyurethane foam.

The invention relates to the polyurethane foam, wherein said low impact resilience polyurethane foam consists of isocyanate component, polyol that average number of functional group is 2~4 and value of hydroxyl group is 30~60 mgKOH/g, and the polyol that average number of functional group is 2~4 and value of hydroxyl group is 200~270 mgKOH/g.

The invention relates to the polyurethane foam, wherein said low impact resilience polyurethane foam consists of isocyanate component, polyol that average number of functional group is 2~4 and value of hydroxyl group is 80~120 mgKOH/g, and the polyol that average number of functional group is 2~4 and value of hydroxyl group is 150~210 mgKOH/g.

When the particle diameter is less than 0.01 μm, since a preparation is difficult, and, when the particle diameter exceeds 1 μm, it is difficult to obtain coloring effect with dispersing the carbon powder approximately equally.

DETAILED DESCRIPTION OF THE INVENTION

Figure 1:
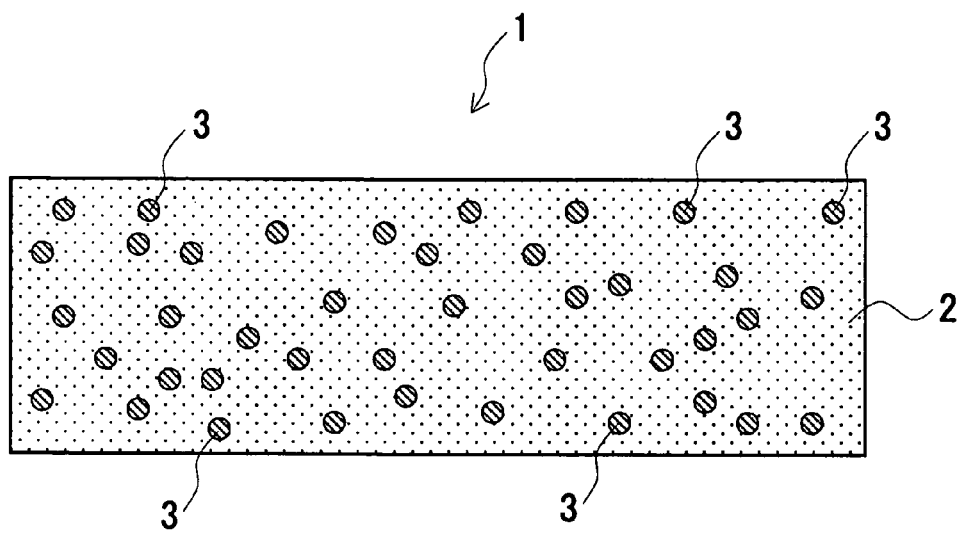
FIG. 1 is a cross sectional view of a polyurethane foam concerning the present invention.

The polyurethane foam concerning the present invention excels in absorbing smell and moisture etc, far infrared radiation irradiation performance and antibacterial effect. A user can realize a composition of additive in the polyurethane foam.

Further, in case of low resilience polyurethane foam is used, it excels in dispersibility of body pressure of the user, and the user does not feel partial oppressive feeling. The low resilience polyurethane foam is effective for prevention of blood flow inhibition and pressure sore.

Hereinafter, the polyurethane foam concerning the present invention is explained. The polyurethane foam of the present invention contains carbon powder and/or inorganic antibacterial agent in it.

By containing the carbon powder, it can absorb smell and moisture in the polyurethane foam. Further, the polyurethane foam can provide far infrared radiation irradiation performance. By containing the inorganic antibacterial agent, antimicrobe effect can be provided by antibacterial action of the inorganic antibacterial agent.

By containing both of the carbon powder and the inorganic antibacterial agent, since the carbon powder adsorbs the moisture in the polyurethane foam, it can obtain excellent antibacterial effect in comparison with the polyurethane foam that only the inorganic antibacterial agent is contained.

Further, by containing both of the carbon powder and the inorganic antibacterial agent, metal color of the inorganic antibacterial agent is conspicuous in black carbon powder. Therefore, the user can easily recognize the compounding of the inorganic antibacterial agent in the polyurethane foam.

Moreover, general flexible polyurethane foam containing the carbon powder and/or the inorganic antibacterial agent with dispersing in the polyurethane foam is used.

In detail, the polyurethane foam consists of polyol component, isocyanate component, foaming agent and catalyst.

Any polyol component used for producing the general flexible polyurethane foam can be used. To be more precise, polyether polyol that ethylene glycol, propylene glycol, diethylene glycol, dipropylene glycol, glycerin, trimethylolpropane, 1,2,6-hexane triol, triethanolamine, pentaerythritol ethylenediamine, tolylenediamine, diphenyl-methane diamine, tetra methylol cyclohexane, methylglucoside, cyclohexanol 2,2,6,6-tetrakis (hydroxyl methyl), diethylenetriamine and diethylenetriamine are chain elongated by propylene oxide, ethylene oxide and butylene oxide, or polyurea dispersion polyol, amine modifier polyol, poly tetramethylene ether glycol can be exemplified. Also, polyester polyol etc obtained by condensation polymerization of multiple alcohol and diacid base can be exemplified.

In the present invention, only one kind of above-mentioned polyol component is used or two or more kinds of the polyol components are mixed.

Any isocyanate component used for producing the polyurethane foam can be used. For example, aliphatic polyisocyanate such as hexamethylene diisocyanate, trimethyl hexamethylene diisocyanate, isophorone diisocyanate, dicyclohexylmethane diisocyanate, cyclohexyl diisocyanate, lysine diisocyanate, metylcyclohexane diisocyanate can be exemplified.

Further, aromatic polyisocyanate such as toluene diisocyanate, diphenyl-methane diisocyanate, phenylene diisocyanate, dimethyl diphenyl diisocyanate, dianisidine diisocyanate, xylene diisocyanate, tetramethyl xylene diisocyanate, naphthalene diisocyanate, dimethyl triphenylmethane tetra isocyanate, triphenylmethane triisocyanate, tris (isocyanate phenyl) thiophosphate and polymeric diphenyl methane diisocyanate can be exemplified. Moreover, transmutation of these isocyanate components can be exemplified. In the present invention, only one of said isocyanate components or two or more isocyanate components with mixing can be used.

The blending quantity of the isocyanate component is enough, as long as same as in producing of usual polyurethane foam. It is adjusted so that an index is 60~130 and desirably usual 80~120 to 100 weight part of the polyol component.

In case of the index is less than 60 or exceeds 130, desirable polyurethane foam cannot be obtained.

In the present invention, as polyurethane foam, low resilience polyurethane foam is desirably used. The low resilience polyurethane foam is adjusted so that rebound resilience ratio is less or equal 30%, desirably less or equal 0~20%, more desirably less or equal 0~15%.

In case of the rebound resilience ratio exceeds 30%, desirable low resilience cannot be obtained. Low resilience polyurethane foam adjusted so that return time of point pressurization under 20° C. is less or equal 35 seconds, desirably 5~30 seconds, more desirably 7~25 seconds.

By adjusting return time of point pressurization under 20° C. is less or equal 35 seconds, for example, when the polyurethane foam having excellent low resilience is used as a cushion, feeling in use, excellent deodorization and hygroscopic property can be obtained.

The return time of point pressurization is time until returning to original thickness of a test piece (50×380×380 mm) from reducing load under certain temperature. After maximum compression is pressurized with a test stick (length 10 cm and diameter 25 mm) having an edged point, the stick is removed and the time is countered.

When a mold foam is used, the desirable temperature is under 20° C. and return time of point pressurization is less or equal 20 seconds. When a slab foam is used, the desirable temperature is under 20° C. and return time of point pressurization is less or equal 10 seconds.

Though both of the mold foam and the slab foam can be used in the present invention, the mold foam is more desirable.

The low resilience polyurethane foam produced by usual production technique is used. Especially, in the present invention, the low resilience polyurethane foam produced with using mixture of polyol that average functional group number is 2~4, and hydroxyl value is 30~60 mg KOH/g and polyol that average functional group number is 2~4, and the hydroxyl value is 200~270 mg KOH/g can be used.

Compounding quantity of former polyol and latter polyol is not limited especially, 34~75 weight % of formaer polyol and 25~66 weight % of latter polyol are preferably used.

When the compounding quantity of former polyol is less than 34 weight % (that is, compounding quantity of latter polyol exceeds 66 weight %), foam is too rigid and obtaining of desirable low resilience is difficult. When the compounding quantity of former polyol exceeds 75 weight % (that is, compounding quantity of latter polyol less than 25 weight %), the foam is too soft and obtaining of desirable low resilience is also difficult.

As polyol of average functional group number is 2~4, and the hydroxyl value is 30~60 mg KOH/g of Boranol V3022J (brand name) of Mitsubishi Chemical Dow Co. Ltd. can be exemplified.

Further, as polyol of average functional group number is 2~4, and the hydroxyl value is 200~270 mg KOH/g of Boranol MN700 (brand name) of Mitsui Takeda chemical Inc can be exemplified.

In the present invention, viscosity of polyol component under 25° C. is adjusted at 400~600 cp and desirably 450~550 cp. When the viscosity of polyol component is less than 400 cp and exceeds 600 cp, the polyurethane foam having desirable low resilience may not be foamed.

Further, in the present invention, the low resilience polyurethane foam produced with using mixture of polyol that average functional group number is 2~4, and the hydroxyl value is 80~120 mg KOH/g and polyol that average functional group number is 2~4, and the hydroxyl value is 150~210 mg KOH/g can be used.

Compounding quantity of former polyol and latter polyol is not limited especially, 34~75 weight % of formaer polyol and 25~66 weight % of latter polyol are preferably used.

When the compounding quantity of former polyol is less than 34 weight % (that is, compounding quantity of latter polyol exceeds 66 weight %), the foam is too rigid and obtaining of desirable low resilience is difficult. When the compounding quantity of former polyol is exceeds 75 weight %

(that is, compounding quantity of latter polyol less than 25 weight %), the foam is too soft and obtaining of desirable low resilience is difficult.

As polyol of average functional group number is 2~4 and the hydroxyl value is 80~120 mg KOH/g, of Actcall LR-00 (brand name) of Mitsui Takeda chemical Inc can be exemplified.

As polyol of average functional group number is 2~4, and the hydroxyl value is 150~210 mg KOH/g, of Actcall LR-03 (brand name) of Mitsui Takeda chemical Inc can be exemplified.

Further, in the present invention, the low resilience polyurethane foam produced with using mixture of polyol that average functional group number is 2~4, and the hydroxyl value is 20~60 mg KOH/g, polyol that average functional group number is 1.5~4.5, and the hydroxyl value is 200~300 mg KOH/g and polyol that average functional group number is 2~4, and the hydroxyl value is 80~150 mg KOH/g can be used.

Content of polyol that average functional group number is 2~4 and the hydroxyl value is 20~60 mg KOH/g is not limited especially, but the content is 40~80 weight % and desirably 50~70 weight % in total amount of polyol component.

Content of polyol that average functional group number is 1.5~4.5 and the hydroxyl value is 200~300 mg KOH/g is not limited especially, but the content is 15~40 weight % and desirably 50~70 weight % in total content of polyol component.

Content of polyol that average functional group number is 2~4, and the hydroxyl value is 80~150 mg KOH/g is not limited especially, but the content is 1~15 weight % and desirably 5~13 weight % in total content of polyol component.

As isocyanate component used in producing the low resilience polyurethane foam, toluenes diisocyanate (TDI-80, TDI-65) and crude-diphenyl-methane diisocyanate (Crude-MDI), etc. are desirably used.

Takenate 80 (brand name) of Mitsui Nisso urethane Co. Ltd. can be exemplified as marketed production.

Any foaming agent for producing of the polyurethane foam can be used. To be more precise, Freon compound such as trichlorofluoromethane, methylene chloride, dichlorodifluoromethane, water, acid amide, nitroalkane, sodium bicarbonate or ammonium bicarbonate can be exemplified. Water or mixture of water and low boiling point organic compound such as methylene chloride can be suitably used.

In the present invention, only one kind of said foaming agents or two or more kinds foaming agents with mixing can be used.

The compounding quantity of the foaming agent is enough, if it has same quantity in producing of the usual polyurethane foam. Concretely, it is adjusted so that the quantity is 1.0~6.0 weight part, and desirably 1.8~5.0 weight part to 100 weight part of polyol component.

In case of the compounding quantity of the foaming agent is less than 1.0 weight part or exceeds 6.0 weight part, the desirable polyurethane foam cannot be foamed desirably.

Any catalyst for producing of polyurethane foam can be used. To be more precise, tin catalyst such as dibutyltin dilaurate, dibutyltin acetate and stannous octate can be exemplified. Tertiary amine catalyst such as tripropylamine, triethylenediamine, dimethylethanolamine, triethylamine, tetramethyl hexamethylenediamine, N-methylmorpholine and N-ethyl morpholine can be exemplified. Further, well-known urethane catalyst, for example, organic metal and organic acid can be exemplified.

In the present invention, only a kind of the catalyst is used or two or more kinds of above-mentioned catalysts are blended.

The compounding quantity of the catalyst is enough, if it has same quantity in producing of usual polyurethane foam. Concretely, it is adjusted so that the quantity is 0.01~5.0 weight part, and desirably 0.5~3.0 weight part to 100 weight part of polyol component.

In case of the compounding quantity of the catalyst is less than 0.01 weight part or exceeds 5.0 weight part, the desirable polyurethane foam cannot be foamed.

In the present invention, except for above-mentioned components, multiple alcohol, chain extender, plasticizer, flame retardant, foam stabilizer, organic powder, metalhydroxide, inorganic powder, pigment, dyestuff, colorant, inorganic extender, organic solvent, antioxidant, ultraviolet absorbing agent and hydrolysis inhibitor can be compounded properly.

Foaming rate of the polyurethane foam is not limited especially, 50~90% is desirable.

In the present invention, the carbon powder is contained in the polyurethane foam.

As carbon powder contained in urethane foam, any carbon powder which particle diameter is 0.01 μm and over can be used. Further, also the carbon powder which particle diameter is more than 500 μm can be used.

In the present invention, in case of the carbon powder has particle diameter 0.01 μm and over, its length is not limited particularly. When a carbon powder having less than 1 μm is used, the particle diameter is 0.01~1 μm, desirably 0.01~0.8 μm, more desirably 0.05~0.5 μm.

The purpose of use of the carbon powder less than 1 μm is for pigmenting urethane foam to be black.

Further, when the carbon powder having particle diameter 1~500 μm, the particle diameter is preferably 10~400 μm and more preferably 100~300 μm. Compounding a carbon powder having particle diameter of 1~500 μm is for removing odor and controlling humidity. In case of the particle diameter is less or equal 1 μm, property of removing odor or controlling humidity decreases, and in case of the particle diameter is more than 500 μm, the carbon powder cannot be maintained with dispersing in the foam. Therefore, both cases are not desirable.

When the carbon powder having particle diameter more than 500 μm is used, the particle diameter is 500~2000 μm, preferably 600~1500 μm, more preferably 750~1000 μm.

A purpose of using carbon powder having particle diameter more than 500 μm is for moisture absorption, removing the odor and showing existence the carbon particle to a user.

In case of the particle diameter is less than 500 μm, visual effects cannot be obtained enough, and in case of the particle diameter exceeds 2000 μm, the carbon particle may drop from the foam, and both cases are not desirable.

As carbon powder, hard charcoal obtained from burning a raw wood at 750~1200° C. and carbonizing at 350~520° C., and soft charcoal obtained from burning a raw wood at 400~750° C. and carbonizing at 250~450° C. are preferably used.

For example, as the hard charcoal, bintyo charcoal that the raw wood of *Quercus phillyraeoides* is burned at around 1200° C. can be used. As the soft charcoal, a charcoal that the raw wood is *Quercus acutissima* and *Quercus serrta* Thunb can be exemplified. Further, bamboo charcoal belonging to poaceous plant (*Gramineae*), carbon black and activated charcoal can suitably be used. In the present invention, especially porous carbon powder of charcoal and charcoal using bamboo charcoal are preferably used, and using of bintyo charcoal is more preferably.

In the present invention, mixture of the carbon black and charcoal and/or bamboo charcoal can be used. By blending carbon black, dispersibility of charcoal and bamboo charcoal is improved. Further, by blending the carbon black, entire of the polyurethane foam can be pigmented, and a user can recognize existence the inorganic antibacterial agent easily.

In case of the carbon black is blended, its particle diameter is not limited especially, but the diameter is set as 0.01~1 μm.

A blending ratio of the carbon black and charcoal and/or bamboo charcoal is bamboo charcoal:carbon black=1:0.5~5, preferably 1:1~3, more desirably 1:1.5~2.5 in weight ratio. In case of weight of the blended carbon black is less than half of weight of the blended charcoal and/or bamboo charcoal, effect of blending of the carbon black cannot be obtained. Further, in case of weight of the blended carbon black exceeds 5 times than the blended charcoal and/or bamboo charcoal, blended quantity of charcoal and/or bamboo charcoal decreases in comparison, and hygroscopic property and deodorizing effect also decreases. Therefore, both cases are not desirable.

A blended quantity of carbon powder is 0.01~30 weight % to entire quantity. In case of blended quantity of the carbon powder is less than 0.01 weight %, an effect obtained by blending the carbon powder cannot be obtained. Further, in case of the blended quantity of the carbon powder exceeds 30 weight %, the dispersibility is bad and foaming may not be well. Therefore, both cases are not desirable. Further, in case of the particle diameter of the carbon powder is 0.01~1 μm, desirably 0.1~20 weight %, more desirably 0.5~15 weight %. Further, in case of the particle diameter is 1 μm or equal, desirably 0.1~10 weight %, more desirably 0.5~5 weight %.

The inorganic antibacterial agent is contained in the polyurethane foam of the present invention. As the inorganic antibacterial agent, metal ion antibacterial agent is desirable. For example, silver, copper, zinc and titanium dioxide can be exemplified.

In the present invention, silver and titanium dioxide are desirably blended, because they are significantly antibacterial. When silver and titanium dioxide are blended with the carbon powder, excellent antibacterial effect can be obtained.

In the present invention, both of silver and titanium dioxide are desirably blended, because excellent antibacterial effect can be obtained than only silver or titanium dioxide is blended.

A blending quantity of the inorganic antibacterial agent is not limited especially, but the blended quantity of carbon powder is set as 0.01~30 weight % to entire quantity, and desirably 0.1~10 weight %. In case of blended quantity of the inorganic antibacterial agent is less than 0.01 weight %, the polyurethane foam cannot be obtained antibacterial effect. In case of the blended quantity of the inorganic antibacterial agent exceeds 30 weight %, in producing the polyurethane foam, foaming may be prevented, and the inorganic antibacterial agent may be dropped from the polyurethane foam.

When both of silver and titanium dioxide are blended, its blending ratio is not limited especially, but total blending quantity of silver and titanium dioxide is desirably within range of said quantity, and silver:titanium dioxide=1:0.1~10, and desirably 1:0.3~5.

A particle diameter of the inorganic antibacterial agent is not limited especially, it is 0.1~300 μm and desirably 0.5~100 μm. Further, the particle diameter of the inorganic antibacterial agent is desirably shorter than a diameter of following carbon particle, because the carbon particle can hold the inorganic antibacterial agent and a user can figure out a blending of the inorganic antibacterial agent. In titanium dioxide, anatase type, rutile type and brookite type exists. In the present invention, any titanium dioxide can be used, anatase type titanium dioxide can be used, because it excels in antibacterial effect.

In the present invention, only carbon powder or inorganic antibacterial agent can be blended, or both of these materials can be blended.

The inorganic antibacterial agent can be held in porous carbon powder, and it can be dispersed in polyurethane foam. By holding the inorganic antibacterial agent with dispersing in surface of the porous carbon powder or surface of fine stomate in the carbon powder, the inorganic antibacterial agent excels in dispersiveness. Further since specific surface area is large, mass inorganic antibacterial agent can be blended, and antibacterial effect, deodorization ability and hygroscopic property can be improved.

In case of the inorganic antibacterial agent is held in the porous carbon powder, the porous carbon powder having larger particle size than particle size of the inorganic antibacterial agent is used.

A method for holding the inorganic antibacterial agent in the porous carbon powder is not limited especially, for example, a holding method by blending the carbon powder and the inorganic antibacterial agent in water, and a holding method that after the inorganic antibacterial agent and raw material of the carbon powder are blended, it is burned at 500~1000° C. can be exemplified.

In the inorganic antibacterial agent is blended with wood flour etc, if necessary, a shape-retaining agent such as clay or adhesive agent can be added.

In the present invention, as a method for holding inorganic antibacterial agent in surface or inside of stomate of the porous carbon powder, precipitation sedimentation, methods such as vapor phase grafiting, electroless plating and deposition can be used.

The inorganic antibacterial agent and the carbon powder can be blended in the range of said quantity, and it is desirable that the inorganic antibacterial agent and the carbon powder are blended to be 1:0.1~10 and 1:0.5~5 in weight ratio.

In case of blending quantity of the carbon powder is less than 0.1 times of blending quantity of the inorganic antibacterial agent in weight, visual effects of blending of carbon powder is low.

In case of blending quantity of the carbon powder exceeds 10 times of the inorganic antibacterial agent in weight, blending quantity of the carbon powder is more than the blending quantity of the inorganic antibacterial agent, and it also lacks in the visual effects.

FIG. 1 to 4 shows a cross sectional view of the polyurethane foam of the present invention. A polyurethane foam (1) shown in FIGS. 1 and 2, a carbon particle (3) is contained in a polyurethane foam (2).

Figure 3:
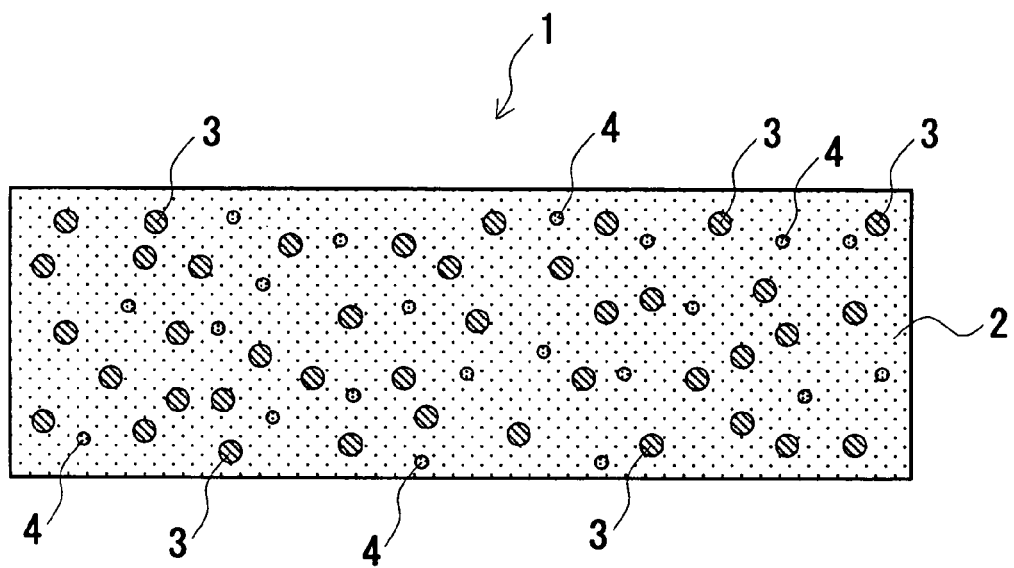
FIG. 3 is a cross sectional pattern view of the polyurethane foam concerning the present invention.
Figure 4:
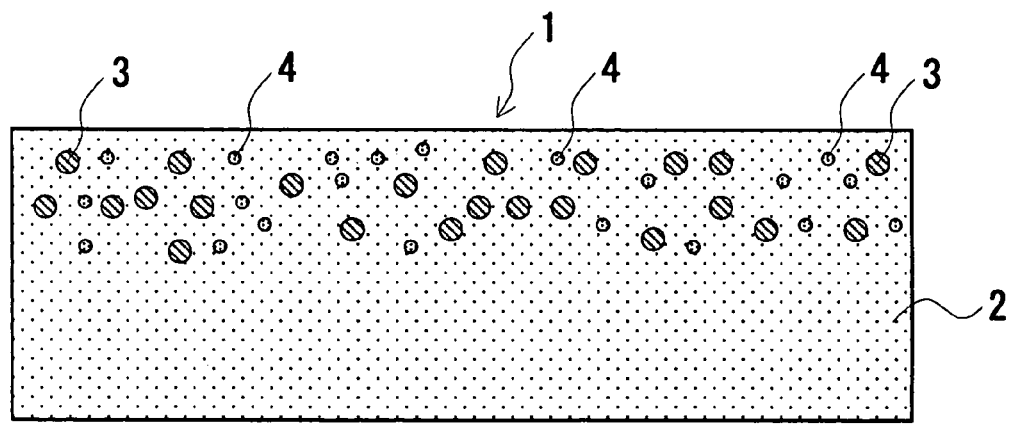
FIG. 4 is a cross sectional pattern view of the polyurethane foam concerning the present invention.

In the polyurethane foam (1) shown in FIGS. 3 and 4, the carbon particle (3) and an inorganic antibacterial agent (4) is contained.

As shown in the cross sectional view shown in FIG. 1 or 3, the carbon particle (3) and/or the inorganic antibacterial agent (4) is dispersed uniformly and held in the polyurethane foam (2).

Figure 2:
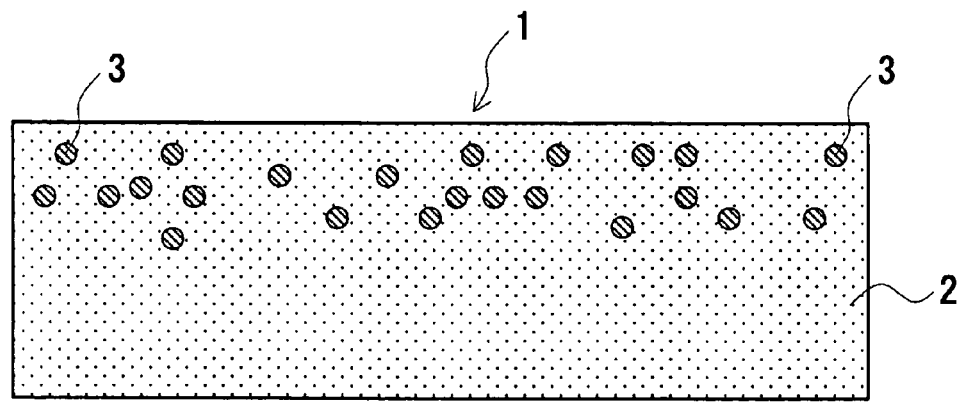
FIG. 2 is a cross sectional pattern view of the polyurethane foam concerning the present invention.

Further, in FIG. 2 or 4, the carbon particle (3) and/or the inorganic antibacterial agent (4) dispersed and held in the polyurethane foam (2) are held in a surface of the polyurethane foam.

In the polyurethane foam of the present invention, the carbon particle absorbs bad odor and moisture in the polyurethane foam. Further, the inorganic antibacterial agent excels in deodorization ability, hygroscopic property and antibacterial activity so that the mineral antibacterial agent may suppress the reproduction of molds, etc.

In addition to bad odor and moisture in the polyurethane foam, also, the carbon particle and the inorganic antibacterial agent can adsorb bad odor and moisture included in air passing the polyurethane foam. For example, when the polyurethane foam is used as a cushion of a sheet used in an automobile, bad odor peculiar to the automobile can be reduced. Since the carbon particle has far infrared radiation effect, for example, when the polyurethane foam is used as bedclothes, it can raise warmth-retaining property.

The carbon particle and the inorganic antibacterial agent are dispersed and held in both of surface and inside of the polyurethane foam.

Compared to dispersed and held in a part of the polyurethane foam, specific surface area of the carbon particle and the inorganic antibacterial agent is increased, and deodorization ability, hygroscopic property and antibacterial activity can be raised.

The polyurethane foam can be used for various product, and especially, it is used as bedclothes such as futon and pillow, seat of a chair, floor material, wall material and shoe sole etc. with utilizing its deodorization ability, hygroscopic property and antibacterial activity.

A suitable production method of the polyurethane foam described above is explained in detail. A suitable production method of the polyurethane foam is explained depend on particle diameter of contained carbon powder.

In case of the particle size of the carbon powder is 0.01~1 μm, when polyol component and isocyanate component is blended, the carbon particle and the inorganic antibacterial agent is blended at once, and these materials are heated, foamed and molded. By blending the polyol component and the isocyanate component, the carbon particle and/or the inorganic antibacterial agent, a catalyst can suitably foam without being adsorbed in the carbon powder.

When the carbon powder having particle diameter 0.01~1 μm, carbon black is desirably used with blending, because the dispersiveness of the carbon powder can be raised.

As an example of the producing method, at first, if the polyol component and the isocyanate component are solid, they are melted. Heating temperature of melting is as well as the temperature in producing of usual polyurethane foam, and the temperature is 50~80° C. If necessarily, the materials are depressurized, and dehydrated and defoamed.

Next, catalyst, foaming agent or other additive are added in the polyol component. Temperature of this process is as well as the temperature in producing regular polyurethane foam, and the temperature is 15~60° C.

Finally, when the polyol component and the isocyanate component blended various additives, the carbon particle and the inorganic antibacterial agent are blended. By heating, foaming and molding, the polyurethane foam of the present invention can be produced. Heating temperature is about 90~250° C.

Next, a producing method of the polyurethane foam that a particle diameter of the carbon powder exceeds 1 μm is explained. In this method, after dispersing carbon powder and/or inorganic antibacterial agent with previously blending, these materials are blended with polyol component, heated, foamed and molded.

By heating, foraming and molding with polyol component after dispersing carbon powder and/or inorganic antibacterial agent with previously blending, the carbon powder and/or inorganic antibacterial agent is held with equally dispersing in the polyurethane foam without unevenness.

As an example of the producing method, at first, if the polyol component and the isocyanate component are solid, they are melted. Heating temperature of melting is as well as the temperature in producing of usual polyurethane foam, and the temperature is 50~80° C. If necessarily, the materials are depressurized, and dehydrated and defoamed.

Next, catalyst, foaming agent or other additive is added in the polyol component. Temperature of this process is as well as the temperature in producing regular polyurethane foam, and the temperature is 15~60° C.

Finally, when the polyol component and the isocyanate component blended various additives, the carbon particle and the inorganic antibacterial agent is blended. By heating, foaming and molding, the polyurethane foam of the present invention can be produced. Heating temperature is about 90~250° C.

In this producing method, by blending and foaming the isocyanate component and the polyol component dispersed substantively equally with previously blending the carbon powder, if the carbon powder has a particle diameter 1 μm and over, the polyurethane foam that the carbon powder is dispersed and held without unevenness can be produced. In case of the carbon powder having particle diameter more than 500 μm, as shown in FIG. 2, the carbon powder concentrates in a surface of the polyurethane foam with dispersing in the polyurethane foam, and texture is well.

Both of a continuous method and a discontinuous method can be used preferably to produce the polyurethane foam.

Further, both of a slab foaming and mold foaming can be used preferably to produce the polyurethane foam. In case of the polyol component of that average number of functional group is 2~4 and value of hydroxyl group is 30~60 mgKOH/g or average number of functional group is 2~4 and value of hydroxyl group is 200~270 mgKOH/g is used, the slab foaming is used.

In case of the polyol component of that average number of functional group is 2~4 and value of hydroxyl group is 80~120 mgKOH/g, average number of functional group is 2~4 and value of hydroxyl group is 150~210 mgKOH/g is used, average number of functional group is 2~4 and value of hydroxyl group is 20~60 mgKOH/g, average number of functional group is 1.5~4.5 and value of hydroxyl group is 200~300 mgKOH/g or average number of functional group is 2~4 and value of hydroxyl group is 80~150 mgKOH/g, the mold foaming is used.

In case of the mold foaming is used, a thin coat having permeability in surface of the polyurethane foam is foamed.

Embodiment

The present invention is explained in detail by embodiment, but the invention is not limited in the following embodiment.

(Preparation of Sample 1)

Each sample of embodiment 1~4 and comparative example 1 is prepared by composition shown in table 1. The preparation method is that first, in polyol component, after compounded components except for isocyanate component previously, and then this polyol component and isocyanate component are blended and reacted. Each sample is prepared by heating 10 minutes and maturing under condition of 60~75° C. in furnace. As polyol component, Boranol V 3022 J (brand name) made by Mitsubishi Chemical Dow Co. Ltd. and MN 700 (a brand name) made by Mitsui Takeda chemical Inc were used by equivalence blending. Also, as isocyanate component, toluene diisocyanate (TDI-80) was used. As catalyst, stannous octate, and as carbon powder, bintyo charcoal were used respectively.

(Preparation of Sample 2)

A sample of embodiment 5 is prepared following to the composition described in the Table 1. As a preparation method, at first, after previously blending components except for carbon powder, inorganic antibacterial agent and isocyanate component in polyol component, this polyol component, isocyanate component, carbon powder and inorganic antibacterial agent were simultaneously blended and reacted. In a furnace, under temperature of 60~75° C., said materials were prepared by heating 10 minutes and matured. Carbon black having particle diameter less than 1 μm was used. Other materials were as same as the embodiment 1 to 4.

TEST EXAMPLE 1

Measurement of Hardness and Firing Pressure Return Time

Hardness of the each sample of embodiment 1~5 and comparative example 1 as mentioned above were measured based on the method prescribed in JIS-K6400. That is, by using testing machine installed 200 mm ϕ pressurization disc, weightings is measured that sample of 50×380×380 (mm) was dummy compressed to 75% thickness before pressurization, and then compressed to 25% thickness to original thickness by velocity 100 mm per minutes.

Also, after each sample of embodiment 1~5 and comparative example 1 as prepared above under temperature condition 20° C. was added fixed load, and then removed this load, time (firing pressure return time) that a hollow foamed by load returns until the situation without adding any load was measured. The result is shown in Table 1.

TABLE 1

| | Embodiment 1 | Embodiment 2 | Embodiment 3 | Embodiment 4 | Embodiment 5 | Comparative Example 1 |
|---|---|---|---|---|---|---|
| Polyol component (part by weight) | 100 | 100 | 100 | 100 | 100 | 100 |
| Isocyanate component (index) | 100 | 100 | 100 | 100 | 100 | 100 |
| Water (part by weight) | 2.0 | 2.0 | 2.0 | 2.0 | 2.0 | 2.0 |
| Silicone surfactant (part by weight) | 1.0 | 1.0 | 1.0 | 10 | 1.0 | 1.0 |
| Catalyst (part by weight) | 0.4 | 0.4 | 0.4 | 0.4 | 0.4 | 0.4 |
| Frame retardant (part by weight) | 12 | 12 | 12 | 12 | 12 | 12 |
| Black pigment (part by weight) | 2.0 | 2.0 | 2.0 | 1.8 | — | — |
| Carbon black (part by weight) | — | — | — | — | 1.5 | — |
| Charcoal (particle diameter is 500 μm) (part by weight) | — | 0.6 | — | 0.5 | — | — |
| Charcoal (particle diameter is 200 μm) (part by weight) | 0.7 | — | 0.3 | — | — | — |
| Silver powder (part by weight) | 0.5 | — | 0.5 | 1.0 | — | — |
| titanium dioxide (part by weight) | — | 0.5 | 0.5 | — | 1.0 | — |
| Hardness (N/314 cm$^2$) | 2.04 | 1.98 | 1.87 | 2.21 | 2.10 | 2.02 |
| Firing pressure return time(s) | 22 | 19 | 30 | 13 | 20 | 21 |

As shown in the Table 1, the polyurethane foam of the present invention having substantive same property with the polyurethane foam without having the carbon powder and the inorganic antibacterial agent.

In the samples of each embodiment, the carbon powder and the inorganic antibacterial agent are dispersed and held in the polyurethane foam.

TEST EXAMPLE 2

Antibacterial Test

Following to compositions shown in Table 2, samples of embodiment 6 and 7 and comparative example 2 were prepared as same as the embodiment 1 to 4. In the embodiment 7, silver powder is used with holding in charcoal.

Next, each prepared sample were cut in 45 mm×5 mm×2 mm and being put into a sterilizing petri dish. Liquid having *Escherichia coli* about 10/mL was seeped into the sample in the petri dish. Outside of the petri dish was covered with a film without infecting fungus from outside.

The liquid was collected after 24 hours, then it was cultured in a medium culture and number of fungus of the sample was counted.

TABLE 2

|  | Embodiment 6 | Embodiment 7 | Comparative Example 2 |
|---|---|---|---|
| Polyol component (part by weight) | 100 | 100 | 100 |
| Isocyanate component (index) | 100 | 100 | 100 |
| Water (part by weight) | 2.0 | 2.0 | 2.0 |
| Silicone surfactant (part by weight) | 1.0 | 1.0 | 1.0 |
| Catalyst (part by weight) | 0.4 | 0.4 | 0.4 |
| Frame retardant (part by weight) | 12 | 12 | 12 |
| Charcoal (particle diameter is 200 μm) (part by weight) | 1.0 | 1.0 | — |
| Silver powder (part by weight) | 0.5 | 0.5 | — |

After cultivating, in the sample of the comparative example, number of fungus before the test and after 24 hours hardly changed or slight increased. In the sample of the embodiment, *Escherichia coli* hardly found. Therefore, the polyurethane foam of the present invention has antibacterial effect.

TEST EXAMPLE 3

Visual Effects Test

Ten panelists looked the sample of embodiment 6 and the sample of embodiment 6 without containing charcoal. The panelists selected the sample which they thought much silver powder was contained.

9 persons in 10 panelists selected that more silver powder was blended in the sample of the embodiment 6. Therefore, the polyurethane foam containing the silver powder and the carbon powder are superior in the polyurethane foam without containing the carbon powder in visual effects of containing additive.

(Preparation of Sample 3)

Each sample of embodiment 8~11 and comparative example 3 was prepared by composition shown in Table 3. The preparation method was that first, in polyol component, after compounded components except for isocyanate component previously, and then this polyol component and isocyanate component were blended and reacted. Each sample was prepared by heating 10 minutes and maturing under condition of 60~75° C. in furnace. As polyol component, Actcall LR-00 (a brand name) made by Mitsui Takeda chemical Inc and Actcall LR-03 (a brand name) made by Mitsui Takeda chemical Inc were used by equivalence blending. Also, as isocyanate component, toluene diisocyanate (TDI-80) was used. As catalyst, stannous octate, and as carbon powder, bintyo charcoal were used respectively.

(Preparation of Sample 4)

A sample of embodiment 12 was prepared following to the composition described in the Table 3. As a preparation method, at first, after previously blending components except for carbon powder, inorganic antibacterial agent and isocyanate component in polyol component, this polyol component, isocyanate component, carbon powder and inorganic antibacterial agent were simultaneously blended and reacted. In a furnace, under temperature of 60~75° C., said materials were prepared by heating 10 minutes and matured. Carbon black having particle diameter less than 1 μm was used. Other materials were as same as the embodiment 8 to 11.

TEST EXAMPLE 4

Measurement of Hardness and Firing Pressure Return Time

Hardness of the each sample of embodiment 8~12 and comparative example 3 as described above were measured based on the method prescribed in JIS-K6400. That is, by using testing machine installed 200 mm φ pressurization disc, weightings was measured that sample of 50×380×380 (mm) was dummy compressed to 75% thickness before pressurization, and then compressed to 25% thickness to original thickness by velocity 100 mm per minutes.

Also, after each sample of embodiment 8~12 and comparative example 3 as prepared above under temperature condition 20° C. was added fixed load, and then removed this load, time (firing pressure return time) that a hollow foamed by load returns until the situation without adding any load was measured. The result is shown in Table 3.

TABLE 3

|  | Embodiment 8 | Embodiment 9 | Embodiment 10 | Embodiment 11 | Embodiment 12 | Comparative Example 3 |
|---|---|---|---|---|---|---|
| Polyol component (part by weight) | 100 | 100 | 100 | 100 | 100 | 100 |
| Isocyanate component (index) | 100 | 100 | 100 | 100 | 100 | 100 |
| Water (part by weight) | 2.0 | 2.0 | 2.0 | 2.0 | 2.0 | 2.0 |
| Silicone surfactant (part by weight) | 1.0 | 1.0 | 1.0 | 1.0 | 1.0 | 1.0 |
| Catalyst (part by weight) | 0.4 | 0.4 | 0.4 | 0.4 | 0.4 | 0.4 |
| Frame retardant (part by weight) | 12 | 12 | 12 | 12 | 12 | 12 |
| Black pigment (part by weight) | 2.0 | 2.0 | 2.0 | 1.8 | — | — |

TABLE 3-continued

|  | Embodiment 8 | Embodiment 9 | Embodiment 10 | Embodiment 11 | Embodiment 12 | Comparative Example 3 |
|---|---|---|---|---|---|---|
| Carbon black (part by weight) | — | — | — | — | 1.5 | — |
| Charcoal (particle diameter is 500 μm) (part by weight) | — | 0.6 | — | 0.5 | — | — |
| Charcoal (particle diameter is 200 μm) (part by weight) | 0.7 | — | 0.3 | — | — | — |
| Silver powder (part by weight) | 0.5 | — | 0.5 | 1.0 | — | — |
| titanium dioxide (part by weight) | — | 0.5 | 0.5 | — | 1.0 | — |
| Hardness (N/314 cm$^2$) | 2.06 | 1.95 | 1.96 | 2.01 | 2.20 | 2.30 |
| Firing pressure return time(s) | 30 | 21 | 28 | 15 | 19 | 25 |

As shown in Table 3, the polyurethane foam of the present invention having substantive same property with the polyurethane foam without having the carbon powder and the inorganic antibacterial agent.

In the samples of each embodiment, the carbon powder and the inorganic antibacterial agent were dispersed and held in the polyurethane foam.

TEST EXAMPLE 5

Antibacterial Test

Following to compositions shown in Table 4, samples of embodiment 13 and 14 and comparative example 4 were prepared as same as the embodiment 8 to 12. In the embodiment 14, silver powder is used with holding in charcoal.

Next, each prepared sample were cut in 45 mm×5 mm×2 mm and being put into a sterilizing petri dish. Liquid having *Escherichia coli* about 10/mL was seeped into the sample in the petri dish. Outside of the petri dish was covered with a film without infecting fungus from outside.

The liquid was collected after 24 hours, then it was cultured in a medium culture and number of fungus of the sample was counted.

TABLE 4

|  | Embodiment 13 | Embodiment 14 | Comparative Example 4 |
|---|---|---|---|
| Polyol component (part by weight) | 100 | 100 | 100 |
| Isocyanate component (index) | 100 | 100 | 100 |
| Water (part by weight) | 2.0 | 2.0 | 2.0 |
| Silicone surfactant (part by weight) | 1.0 | 1.0 | 1.0 |
| Catalyst (part by weight) | 0.4 | 0.4 | 0.4 |
| Frame retardant (part by weight) | 12 | 12 | 12 |
| Charcoal (particle diameter is 200 μm) (part by weight) | 1.0 | 1.0 | — |
| Silver powder (part by weight) | 0.5 | 0.5 | — |

After cultivating, in the sample of the comparative example, number of fungus before the test and after 24 hours hardly changed or slightly increased. In the sample of the embodiment, *Escherichia coli* hardly found. Therefore, the polyurethane foam of the present invention has excellent antibacterial effect.

What is claimed is:

1. A polyurethane foam including carbon powder an inorganic antibacterial agent, polyol component and isocyanate component,
   wherein said carbon powder is a mixture of (1) porous carbon powder comprising charcoal and (2) carbon black,
   wherein the blending ratio of said porous carbon powder and said carbon black is from 1:0.5 to 1:5 in weight ratio,
   wherein said porous carbon powder has a particle diameter of from 10 μm to 400 μm,
   wherein said carbon black has a particle diameter of from about 0.01 μm to 1 μm,
   wherein said inorganic antibacterial agent is at least one of silver and titanium dioxide,
   wherein the blended quantity of said carbon powder is from 0.01 to 30 weight % to entire of all components quantity,
   wherein the blended quantity of said inorganic antibacterial agent is from 0.01 to 30 weight % to entire quantity,
   wherein said carbon black is contained in the polyurethane foam to improve a dispersibility of said porous carbon powder;
   wherein said inorganic antibacterial agent is held by said porous carbon powder to enhance the antibacterial effect, and wherein said inorganic antibacterial agent is at least on a surface of or inside a stomate of the porous carbon powder,
   wherein said polyurethane foam is a low impact resilience polyurethane foam, and wherein the return time of point pressurization under 20° C. is less or equal 35 seconds.

2. The polyurethane foam described in claim 1, wherein said inorganic antibacterial agent is silver and titanium dioxide.

3. The polyurethane foam described in claim 2, wherein blending ratio of said silver and said titanium dioxide in the antibacterial agent is from 1:0.1 to 1:10.

4. The polyurethane foam described in claim 1, wherein said polyol component consists of polyol that average number of functional group is 2~4 and value of hydroxyl group is 30~αmgKOH/g, and the polyol that average number of functional group is 2~4 and value of hydroxyl group is 200~270 mgKOH/g, wherein the compounding quantity of said polyol that average number of functional group is 2~4 and value of hydroxyl group is 30~60 mgKOH/g is from 34 to 75 weight %, and wherein the compounding quantity of said polyol that average number of functional group is 2~4 and value of hydroxyl group is 200-270 mgKOH/g is from 25 to 66 weight % of entire compounding quantity of polyol components.

5. The polyurethane foam described in claim 1, wherein said polyol component consists of polyol that average number of functional group is 2~4 and value of hydroxyl group is 80~120 mgKOH/g, and polyol that average number of functional group is 2~4 and value of hydroxyl group is 150~210 mgKOH/g, wherein the compounding quantity of said polyol that average number of functional group is 2~4 and value of hydroxyl group is 80~120 mgKOH/g is from 34 to 75 weight %, and wherein the compounding quantity of said polyol that average number of functional group is 2~4 and value of hydroxyl group is 150-210 mgKOH/g is from 25 to 66 weight % of entire compounding quantity of polyol components.

6. A polyurethane foam described in claim 1 wherein said inorganic antibacterial agent is held by at least one of the method selected from the group consisting of (1) blending the porous carbon powder and the inorganic antibacterial agent in water, (2) burning the blending of the inorganic antibacterial agent and raw material of the porous carbon powder and from 500 to 1000° C., (3) precipitation sedimentation, (4) vapor phase grafting, (5) electroless plating and (6) deposition.

* * * * *